(12) United States Patent
Christie, Jr.

(10) Patent No.: US 7,251,544 B2
(45) Date of Patent: Jul. 31, 2007

(54) STORAGE SYSTEM

(75) Inventor: Leslie G. Christie, Jr., Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 10/612,757

(22) Filed: Jul. 1, 2003

(65) Prior Publication Data

US 2005/0004703 A1    Jan. 6, 2005

(51) Int. Cl.
*G06F 7/00* (2006.01)
(52) U.S. Cl. .............. 700/214; 700/218; 700/229; 198/860.1; 360/73.03
(58) Field of Classification Search ........... 700/214, 700/213, 218, 229; 198/860.1; 360/69, 360/73.03; 369/75.11
See application file for complete search history.

(56) References Cited

U.S. PATENT DOCUMENTS

| | | | | |
|---|---|---|---|---|
| 3,494,622 A * | 2/1970 | Zeigler, Jr. ................. | 360/92 |
| 4,063,294 A * | 12/1977 | Burkhart ..................... | 360/92 |
| 4,907,889 A * | 3/1990 | Simone ...................... | 360/92 |
| 5,336,030 A * | 8/1994 | Ostwald et al. ............. | 414/277 |
| 5,353,269 A * | 10/1994 | Kobayashi et al. ......... | 369/30.43 |
| 5,511,871 A | 4/1996 | Dalziel | |
| 5,546,315 A * | 8/1996 | Kleinschnitz ............... | 700/218 |
| 5,647,717 A * | 7/1997 | Yokogawa et al. .......... | 414/273 |
| 5,856,894 A * | 1/1999 | Marlowe .................... | 360/92 |
| 5,999,356 A * | 12/1999 | Dimitri et al. .............. | 360/71 |
| 6,085,123 A * | 7/2000 | Baca et al. ................. | 700/214 |
| 6,198,984 B1 * | 3/2001 | Searle et al. ............... | 700/213 |
| 6,445,652 B1 | 9/2002 | Foslien et al. | |
| 6,580,582 B1 * | 6/2003 | Caverly ....................... | 360/92 |
| 6,808,353 B2 * | 10/2004 | Ostwald et al. ............ | 414/273 |
| 6,865,046 B2 * | 3/2005 | Steinhilber ................. | 360/69 |
| 2002/0032501 A1 * | 3/2002 | Tilles et al. ................ | 700/214 |
| 2004/0081539 A1 * | 4/2004 | Berens ........................ | 414/267 |

* cited by examiner

*Primary Examiner*—Khoi H Tran

(57) ABSTRACT

A storage system comprises a first plurality of storage cartridges along an accessible side of a path, a second plurality of storage cartridges along a non-accessible side of the path, and a transport device to move the first and second plurality of magazines around the path. The storage system further comprises a controller that determines the location of a particular cartridge and operates the transport device to move the particular cartridge to the accessible side of the path to gain access to the particular cartridge. The controller can also be configured to re-position a movable accessor device along the accessible side of the path to access the particular cartridge. The ability to move the cartridges on both sides of the path can at least double the accessible storage capacity of the system.

17 Claims, 6 Drawing Sheets

STORAGE SYSTEM

BACKGROUND OF THE INVENTION

Many different types of automated cartridge storage and handling systems have been developed to store cartridges at known locations, to retrieve the cartridges and transport them to a read/write device, and to return the cartridges to their assigned location in the system. Such data storage and handling systems are often referred to as "autochangers" or "juke box" data storage systems, particularly if they accommodate a large number of individual cartridges.

An autochanger storage system typically includes a cartridge storage rack or "magazine" as well as a read/write device to read data from, and write data to, the cartridges. The cartridge magazines provide storage locations for the cartridges and are commonly arranged so that they form one or more rows of vertical stacks. The cartridge read/write device may be located adjacent the cartridge stack, although the cartridge read/write device can be positioned at any convenient location. The data storage system also typically includes a cartridge access device for removing and inserting the cartridges in the magazines and read/write devices, and a positioning device to transport the access device among the rows and columns of cartridges.

When a host computer system issues a request for data contained on a particular cartridge, a control system associated with the storage system actuates the transport device to move the access device to the desired cartridge. The access device then removes the cartridge from the magazine and the transport device carries the cartridge to the read/write device. The access device inserts the selected cartridge into the read/write device so that the host computer may thereafter read data from, or write data to, the cartridge. After the read/write operation is complete, the access device removes the cartridge from the read/write device and returns it to a specified location in the system.

Although various operational modes are possible, storage systems commonly have the read/write device in a fixed location and use a moveable transport device to transport cartridges between storage racks or magazines and the read/write devices. The transport device is typically a robotic device which moves along a guideway in an X, Y, and/or rotary motion to access the various storage slots. The access device can have a plunge mechanism that engages a cartridge held within the read/write device or magazine and withdraws the cartridge.

Some data storage systems may be configured as scaleable, modular units in which multiple autochanger modules can be connected to incrementally expand the total system storage capacity. Each autochanger module can include a read/write device. In some configurations, multiple autochanger modules can be interconnected and use a single access device and transport device to move among the autochanger modules. In this manner, the access device assembly may access a cartridge from any autochanger module and access data from the cartridge from any read/write device in the stack of autochanger modules. Interconnected autochanger modules increase the total storage capacity and the total number of read/write devices that can be accessed simultaneously. A configuration of interconnected autochanger modules reduces cost since a single access device and transport device can be utilized to access the cartridges in each of the modules.

Often, one such storage system, also referred to as a library, has insufficient storage capacity, and therefore another library may be added to the system. The load balancing between libraries can be difficult, since, in many instances, it is necessary to move many of the data cartridges from one of the libraries to the other so that the workload may be balanced. The problem becomes more pronounced when still more libraries are added to the system. Conventional pass through systems for automated libraries typically require ports in adjacent library walls that allow a small number of data cartridges to be exchanged between the libraries via the access devices. The resulting configuration results in increased overhead for inventory tracking, as well as the number of other resources, such as access devices, that are required for each library.

SUMMARY

In accordance with some embodiments, a storage system includes a movable accessor and a cartridge transport device configured to move a plurality of cartridges along a path. The path includes a front side and a back side with respect to the movable accessor. The movable accessor is configured to access a first group of the plurality cartridges from the front side of the path, and the cartridge transport device is operable to move the first group of the plurality of cartridges to the back side of the path to allow the movable accessor to access a second group of the plurality of cartridges. The movable accessor is operable to move toward the second group of the plurality of cartridges while the cartridge transport device is operating.

In other embodiments, a method for operating an automated storage system includes configuring a first plurality of cartridges along a first side of a path; configuring a second plurality of cartridges along a second side of the path; receiving a request to access a particular cartridge; moving an accessor toward the particular cartridge; and moving the cartridges along the path to allow the accessor to access the particular cartridge.

In still other embodiments, a storage system includes a first set of storage means on a first side of a storage wall, and a second set of storage means on a second side of a storage wall. Transport means is connected between the first side and the second side of the storage wall. Logic means is configured to drive the transport means, and to determine when to operate the transport means to move at least a portion of the first set of storage means to the second side of the storage wall. A movable accessor is operable to move independently of the transport means to access the storage means from the first side of the storage wall.

In further embodiments, a computer product for managing a storage system includes control logic operable to control a transport mechanism to move an assembly of storage components in the storage system from one side of a storage wall that is not accessible by an access device to another side of the storage wall that is accessible by the access device. Other control logic is operable to re-locate a movable access device along the other side of the storage wall to access the storage components.

BRIEF DESCRIPTION OF THE DRAWINGS

Embodiments of the invention relating to both structure and method of operation, may best be understood by referring to the following description and accompanying drawings.

DETAILED DESCRIPTION

Figure 1:
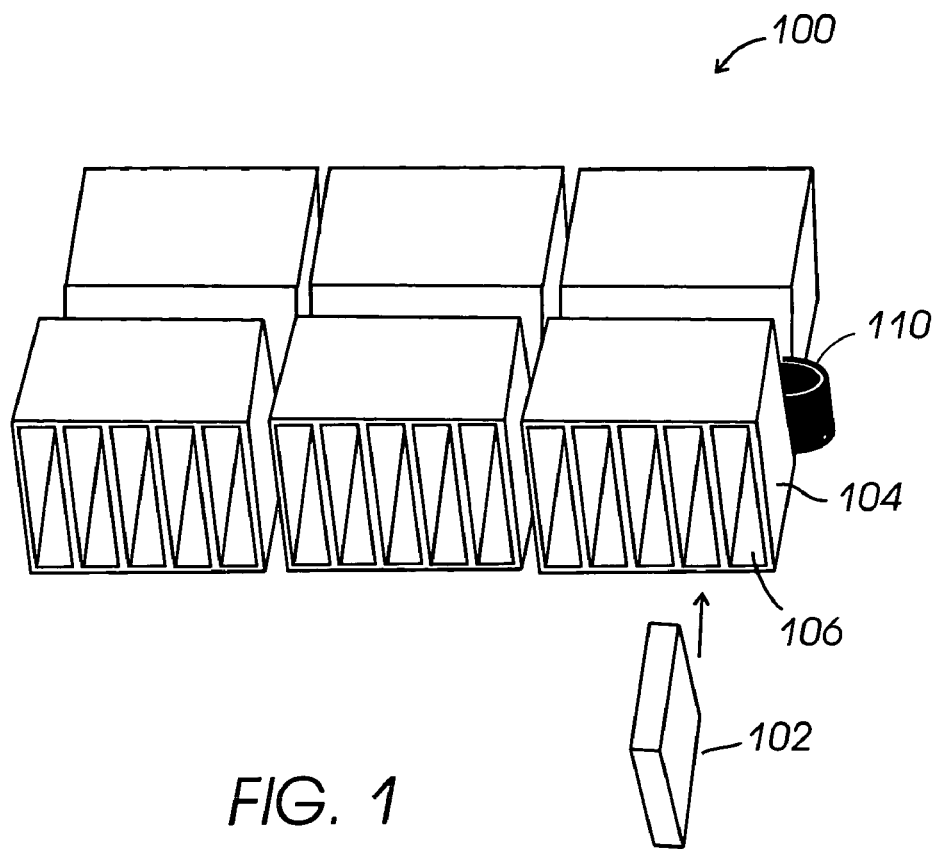
FIG. 1 is a perspective view of an embodiment of a storage cartridge cartridge assembly that provides access to an increased number of cartridges in a storage system.

FIG. 1 is a perspective view of an embodiment of a storage cartridge assembly 100 to provide access to an increased number of cartridges 102 in a storage library system, thereby helping to satisfy ever increasing requirements for cost-effective, space-efficient storage. In some known library storage systems, one or more modular stacks of magazines 104 form a one-sided "wall" of storage. The walls comprise modular stacks of storage cartridge magazines 104 lining the perimeter of the space allowed for the library. When the library storage systems are enclosed in a room, quite of bit of space can be wasted in the center of the room in some configurations. As further described herein, various embodiments of cartridge assembly 100 allow at least double the number of cartridges 102 to be stored in a library within the same amount of floor space as storage libraries having single-sided walls.

In some embodiments, cartridge assembly 100 includes a plurality of magazines 104. Each magazine 104 includes one or more slots 106 for storing readable/writable media contained within a plurality of cartridges 102. Examples of such data storage media include magnetic tape cartridges or cassettes, optical disk cartridges of various types, including ROM, WORM and rewritable, and in various formats. Although different types of cartridges 102 can be stored in slots 106, the term "cartridge" is not limited to data cartridges and is defined as a movable unit of equipment. For example, cartridges 102 can comprise a vile of fluid to be transported in a testing laboratory.

In the embodiment shown, cartridge assembly 100 includes six magazines 104 arranged with three (3) magazines 104 on the front side, and three (3) magazines 104 on the back side of path 110. Slots 106 on each magazine 104 face outward on each side. Cartridge assembly 100 can include more or less magazines 104 than the embodiment shown in FIG. 1. Further, magazines 104 can move around an oval, rectangular, square, circular, or any other suitably shaped path 110, depending at least partially on the amount of space available. Further still, it is anticipated that cartridge assembly 100 can be configured to move along a horizontal or vertical path.

Figure 2:
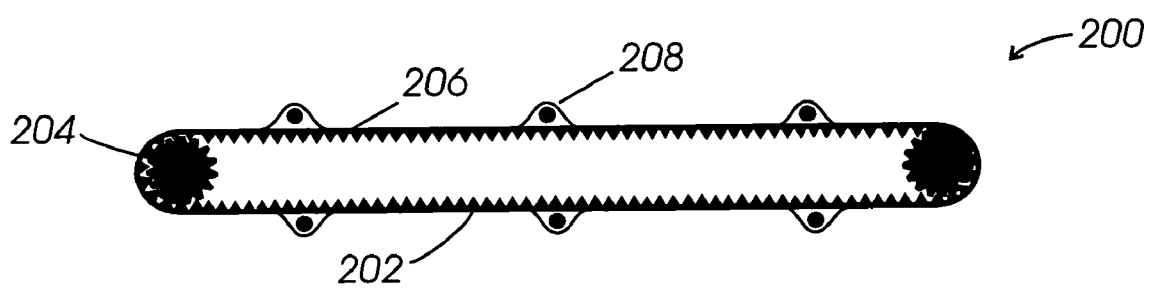
FIG. 2 is a top view of an embodiment of a cartridge assembly transport device.

Referring to FIGS. 1 and 2, FIG. 2 shows a top view of a specific embodiment of a cartridge assembly transport device 200 that utilizes conveyor belt 202 to move magazines 104 along the desired path. In the embodiment shown, the width of conveyor belt 202 is oriented vertically while the length of conveyor belt 202 extends around drive mechanisms, such as gear wheels 204, which are positioned to form path 110 for magazines 104. A plurality of teeth 206 are included on the inner side of conveyor belt 202 to mesh with the teeth of gear wheels 204.

Figure 3:
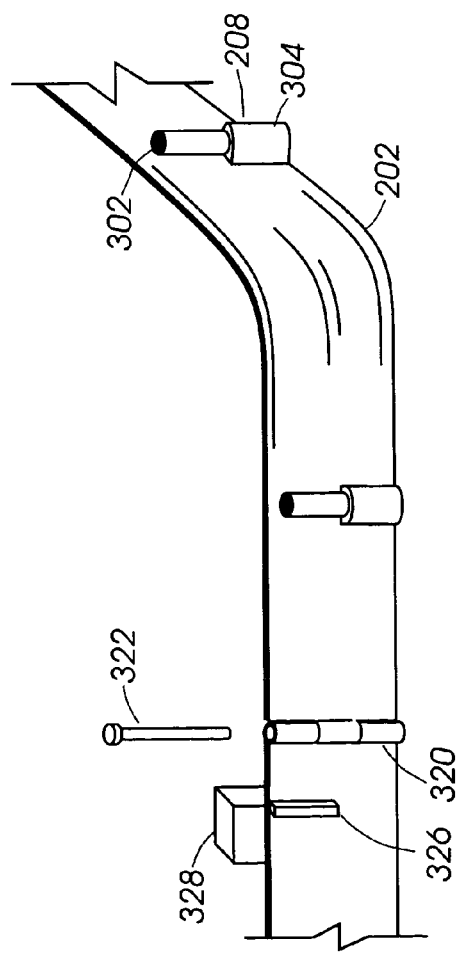
FIG. 3 is a partial view of an embodiment of a conveyor belt that can be utilized with cartridge assembly of FIG. 1.

In the specific embodiment of transport device 200 shown, conveyor belt 202 also includes one or more connectors 208 to releasably attach magazines 104 to conveyor belt 202. FIG. 3 shows further detail of a specific embodiment of connector 208 on conveyor belt 202 including a cylindrical peg 302 mounted to tab 304. Peg 302 and tab 304 can be co-formed on the outer side of conveyor belt 202, or attached to conveyor belt 202 using any suitable fastening means. Peg 302 and tab 304 are fabricated with a material of sufficient strength and rigidity to retain magazines 104 (FIG. 1) on conveyor belt 202 during movement. Additionally, some embodiments of cartridge assembly 100 may not include magazines 104. In such embodiments, connector(s) 208 can be included in a suitable location on cartridge 102.

Figure 4:
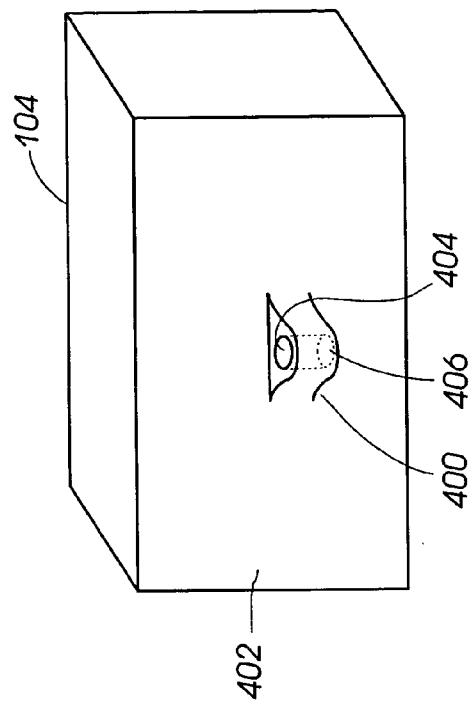
FIG. 4 is a view of an embodiment of the back of a storage cartridge magazine that can be used with the cartridge assembly of FIG. 1.

Referring to FIGS. 3 and 4, FIG. 4 shows an embodiment of a corresponding connector 400 on magazine 104 that is suitable for use with connector 208 on conveyor belt 202 to retain magazine 104 to conveyor belt 202 during movement. Connector 400 includes attachment port 404 formed in tab 406 on back side 402 of magazine 104. In the embodiment shown, tab 406 is positioned above tab 304 on conveyor belt 202, and magazine 104 is connected to conveyor belt 202 by lowering port 404 onto peg 302. The use of a single attachment port 404 allows magazines 104 to move freely around corners in paths defined by conveyor belt 202.

In some embodiments, the length of port 404 and peg 302 is selected to provide sufficient structure to retain magazine 104 without requiring magazine 104 to be lifted more than a desired amount to be removed from cartridge assembly 100. In some configurations, rows of magazine assemblies 100 can be stacked on top of each other, therefore, the length of peg 302 should not be greater than the amount of clearance available between rows in order to allow magazines 104 to be removed or replaced. The length of port 404 and peg 302 can be different. In other embodiments, each magazine 104 can be connected to conveyor belt 202 using more than one peg 302 and port 404.

In other embodiments, port 404 and peg 302 can be oriented horizontally, instead of vertically. In such a configuration, port 404 engages peg 302 laterally to connect magazine 104 to conveyor belt 202. With connectors 208, 400 oriented horizontally, adequate clearance between the sides of magazines 104 can be provided to allow magazines 104 to slide laterally to engage or disengage port 404 and peg 302.

In some embodiments, conveyor belt 202 is a continuous loop of any type of suitable material. In other embodiments, of conveyor belt 202 can include a hinge 320 to facilitate the installation of conveyor belt 202. Pin 322 is removed to allow the ends of conveyor belt 202 to be separated and easily installed around gear wheels 204. Pin 322 is re-inserted through hinge 320 to keep the ends of conveyor belt 202 together once conveyor belt 202 is installed. Other mechanisms to facilitate the installation of conveyor belt 202 can also be utilized, in addition to, or instead of, hinge 320 and pin 322.

Referring again to FIGS. 1 and 2, conveyor belt 202 can also include features to aid in determining the position of magazines 104 relative to a known reference point. This capability is especially important when a system incorporating cartridge assembly 100 is powered down, and then powered up, as well as when magazines 104 move during operation. Storage library systems typically perform an automated inventory during power up to determine the location and contents of each magazine 104. Further, once cartridge assembly 100 rotates, it is important to be able to determine the new locations of magazines 104.

Referring to FIGS. 1, 2, and 3, some embodiments include magnet 326 (FIG. 3) attached to the outer side of conveyor belt 202 as part of a system to track the locations of magazines 104. One or more cartridge assembly position sensors 328, such as a Hall effect switch capable of detecting changes in nearby magnetic flux patterns, can be installed in proximity to the path of conveyor belt 202 to sense the passage of magnet 326. It should be noted that other types of optical, mechanical, or electronic sensor systems can be utilized to track the location of magazines 104 in cartridge assembly 100, in addition to, or instead of, magnet 326 and cartridge assembly position sensor 328. A controller 610 (FIGS. 6 and 7) can include information regarding the physical dimensions and configuration of magazines 104 and cartridges 102, and use information from position sensor 328 to determine the location of each magazine 104 and cartridge 102.

A variety of configurations of conveyor belts 202 can be utilized. For example, in some embodiments, conveyor belt 202 can include a plurality of evenly spaced holes that engage the teeth of gear wheels 204. In still other embodiments, conveyor belt 202 can be driven via frictional forces acting on conveyor belt 202. Such frictional force can be supplied by any suitable mechanism, such as rotating spindles or wheels, instead of, or in addition to, gear wheels 204. When frictional forces are utilized, both conveyor belt 202 and the friction drive mechanisms can be textured to reduce slippage of conveyor belt 202.

In other configurations, magazines 104 can be placed directly on horizontally oriented conveyor belts 202. A horizontally oriented conveyor belt 202 can include mounts or releasable fasteners to retain magazines 104 in place during motion. Alternatively, a vertically oriented conveyor belt that moves magazines 104 in a vertical path can be used. A releasable mechanism that retains cartridges 102 in magazines 104 during motion, and allows cartridges 102 to be removed and replaced, can be included, if required, based on the particular configuration of cartridge assembly transport device 200. As a further alternative, magazines 104 can be suspended from conveyor belt 202 or other transport mechanism.

A variety of configurations and components can be used in transport assembly 200 in addition to, or instead of, conveyor belts 202. For example, a platform can be positioned under cartridge assembly 100 to provide support for magazines 104. When magazines 104 are attached to conveyor belt 202, the platform can have a low-friction surface finish, or some other mechanism such as rollers, to facilitate movement of magazines 104. The platform can also include other mechanisms, such as motor-driven rollers and a channel to both move and guide magazines 104 around the platform, instead of conveyor belt 202. Additionally, structural features that enable rows of magazine assemblies 100 to be stacked can be included to form a wall of magazine assemblies 100. Alternatively, magazine assemblies 100 can be mounted in a rack or other suitable framework to form a two-sided storage wall. Typically, an access device 602 (FIG. 6) will have access to only one side of the two-sided storage wall. Transport assembly 200 can be activated by controller 610 (FIG. 6) to move a requested magazine 104 to the side where it can be accessed, as required.

Figure 5A:
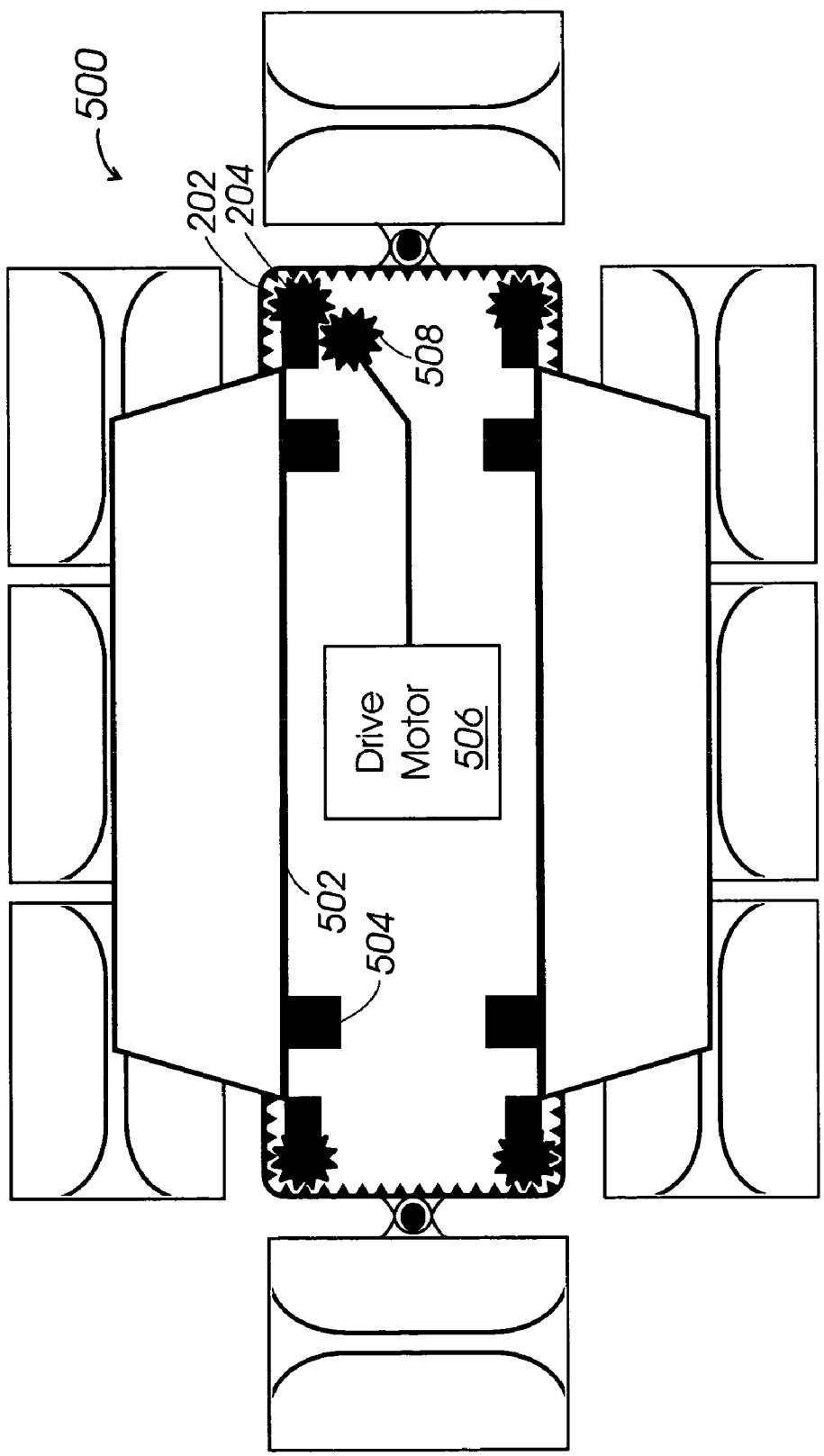
FIG. 5A is a top view of an embodiment of a mounting system for the cartridge assembly shown in FIG. 1.
Figure 5B:
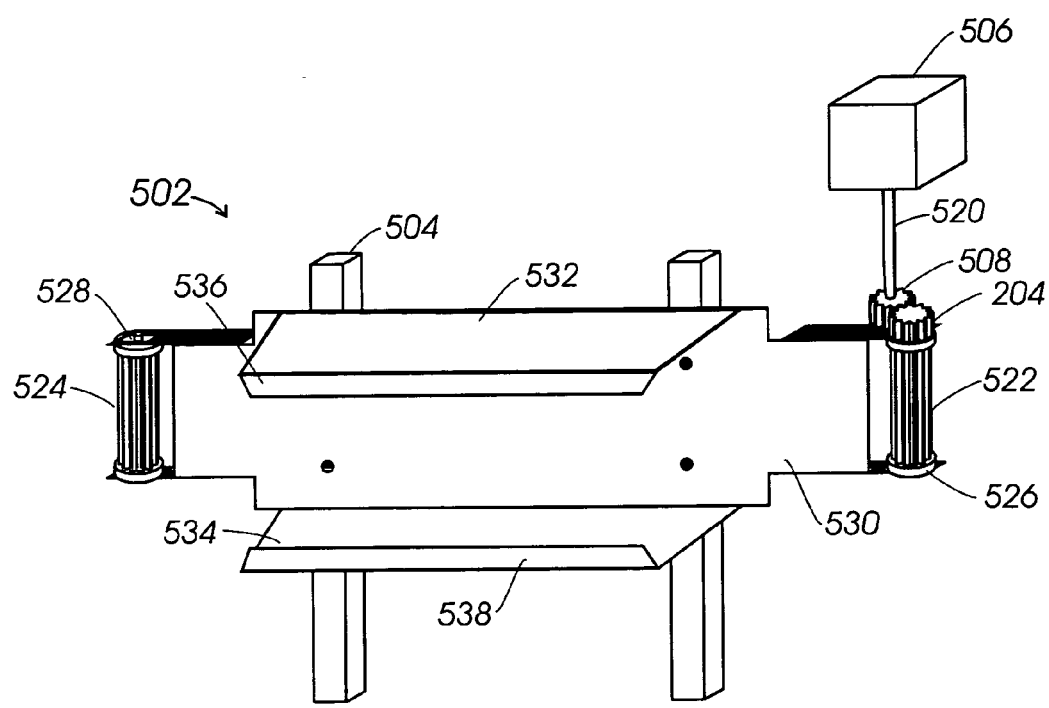
FIG. 5B is a perspective view of an embodiment of a magazine guide suitable for use in the mounting system shown in FIG. 5A.

Referring to FIGS. 5A and 5B, FIG. 5A is a top view of an embodiment of a mounting system 500 for cartridge assembly 100 shown in FIG. 1. Components in mounting system 500 include magazine guide 502, a plurality of support members 504, drive motor 506, and drive members 508. Support members 504 are shown as posts with ends that can be mounted in brackets, or attached in some other manner, to the top and bottom walls of an enclosure. In other embodiments, openings can be included in the ends of support members 504 to receive a support member 504 from another mounting system 500, thereby allowing magazine assemblies 100 to be stacked vertically in rows. Other techniques for stacking mounting system 500, or attaching mounting system 500 to an enclosure, can be utilized.

Drive member(s) 508 can be included at one or more locations along the path of conveyor belt 202. Drive motor 506 is coupled to actuate drive members 508 and move conveyor belt 202. Any suitable type of drive members 508 can be utilized, such as gears wheels, friction wheels, or drive belts. Drive members 508 can be attached to a rod 520 that is coupled to drive motor 506. As drive motor 506 rotates drive member 508, drive member 508 rotates gear wheel 204, which is coupled to roller 522. When two or more mounting systems 500 are stacked vertically, the length of rod 520 can extend through drive members 508, thereby enabling magazine assemblies 100 to be rotated with one drive motor 506. In other embodiments, each mounting system 500, or groups of mounting systems 500, can each include drive motor 506 to allow individual or groups of magazine assemblies 100 to be rotated independently. The position of each magazine 104 at any time can be determined based on the number of rotations of drive member 508. An optical encoder (not shown) can be included with mounting system 500 to sense the number of rotations of drive member 508 during operation.

Figure 5C:
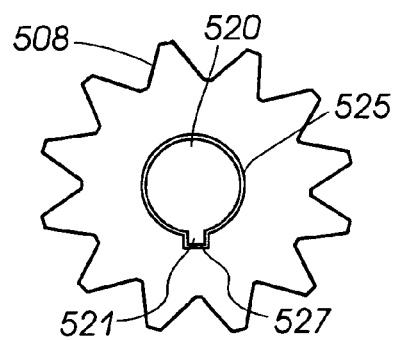
FIG. 5C shows a cross-sectional view of an embodiment of a rod engaged in the center opening of a drive member in the mounting system of FIG. 5A.

FIG. 5C shows a cross-sectional view of an embodiment of rod 520 engaged in center opening 525 of drive member 508. Rod 520 includes a lengthwise raised portion that forms a key 521. The center opening 525 of drive member 508 includes a lengthwise slot 527 to accommodate key 521, thereby providing a mechanism to rotate drive member 508 in clockwise and counter-clockwise directions.

Referring again to FIG. 5B, another roller 524 is positioned at the other end of magazine guide 502 using an adjustable mount 528 that allows roller 524 to be displaced when conveyor belt 202 (FIG. 5A) is attached to mounting system 500. Once conveyor belt 202 is positioned around magazine guide(s) 502, mount 528 can be adjusted to reposition roller 524 and place conveyor belt 202 in tension. A locking mechanism (not shown), such as a detent, can be used with adjustable mount 528 to retain roller 524 in position. As an alternative, a spring-loaded mounting mechanism can be used to allow the position of roller 524 to be adjusted. Flanges 526 at the ends of rollers 522 and 524 can be provided to help retain conveyor belt 202 around rollers 522, 524.

In the embodiment shown, back plate 530 of magazine guide 502 is attached to one or more support members 504.

Any suitable type of mounting brackets or fasteners can be utilized to attach magazine guide 502 to support members 504.

Figure 5D:
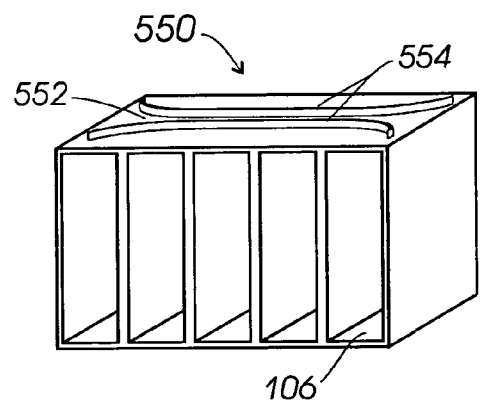
FIG. 5D is a perspective view of an embodiment of a magazine that can be utilized in the mounting system shown in FIG. 5A.

Referring to FIGS. 5B and 5D, FIG. 5D shows an embodiment of a magazine 550. Top plate 532 and bottom plate 534 of magazine guide 502 include reference edges 536, 538, respectively. Reference edges 536, 538 engage channel 552 on the top and bottom of magazine 550 to guide the movement of magazine 550. Bottom plate 534 also provides support for at least a portion one or more magazines 550. In other embodiments, only bottom plate 534 with reference edge 538 is utilized. As a further alternative, a raised guide member (not shown) can be included in top plate 532 and/or bottom plate 534 instead of reference edges 536, 538 to engage channel 552.

In some embodiments, channel 552 is formed between a set of parallel, spaced-apart, raised ridges 554 that extend at least a portion of the width of magazine 550. The ends of raised ridges 554 can be flared outward to increase the ability of reference edges 536, 538 to engage channel 552.

Figure 6:
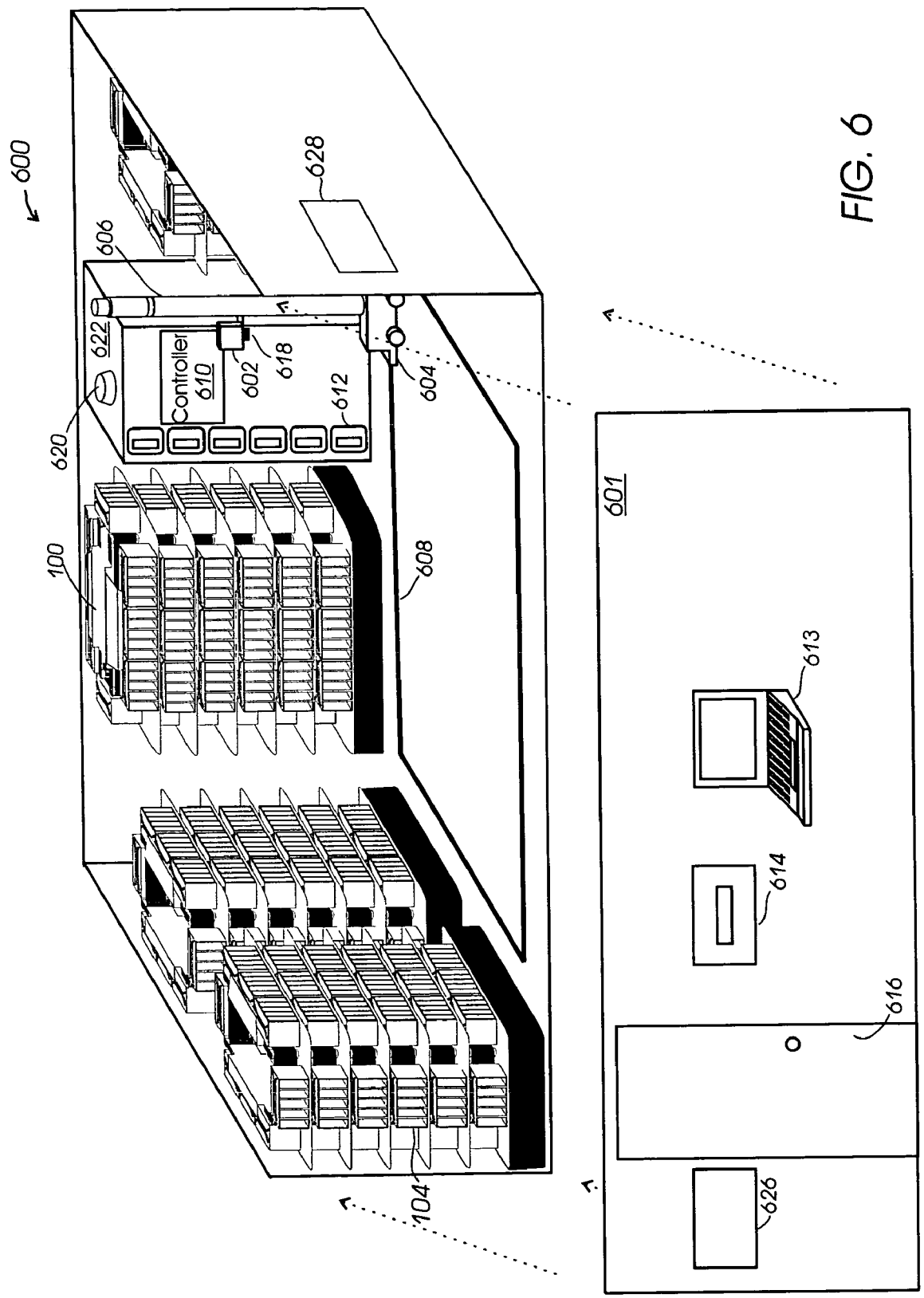
FIG. 6 is a partially exploded perspective view of an embodiment of a multi-level, modular data storage system utilizing a plurality of the magazine assemblies shown in FIG. 1.

Referring to FIGS. 1 and 6, FIG. 6 is a partially exploded perspective view of a multi-level, modular data storage system 600 utilizing a plurality of stacked cartridge assemblies 100 shown in FIG. 1 installed in mounting systems 500 shown in FIG. 5A. Partition 601 is shown separated the other partitions to reveal the components in storage system 600. Note that magazine assemblies 100 are suitable for use in various types and configurations of storage systems, with storage system 600 being just one example.

Each storage system 600 includes at least one access device 602 mounted to transport device 604. Transport device 604 moves along horizontal guideway 608 and access device 602 moves along vertical guideway 606. In the embodiment shown, horizontal guideway 608 includes a track 608 on the floor of storage system 600 around the front of stacked magazine assemblies 100. Vertical guideway 606 is attached to transport device 604 and includes a suitable mechanism, such as a worm gear and drive, to raise and lower access device 602. Access device 602 and transport device 604 are operated by controller 610 as further described herein.

Various suitable types of access devices 602 and transport devices 604 can be utilized in other embodiments. For example, continuous rails can be installed around each row of magazine assemblies 100, and one or more elevator modules installed to transport access device 602 between rows. Such a storage system with rails and elevator modules is disclosed in U.S. Pat. No. 6,222,699 entitled "Modular Data Storage System Utilizing A Wireless Cartridge Access Device."

When controller 610 receives requests to read from, or write to, cartridge(s) 102, controller 610 determines the location of cartridge(s) 102 to be accessed, and simultaneously operates transport device 604, and access device 602, and drive motor 506 (FIG. 5A) on cartridge assembly 100, to access the desired cartridge 102 in the shortest amount of time.

Operator panel 613 allows an operator to issue commands and check the status of storage system 600 from an external location. Operator panel 613 can include one or more input/output devices, for example, a keyboard or a mouse, a user interface accessible via screen display, and/or a printer.

In some embodiments, storage system 600 includes one or more mail slots 614 for delivering and receiving cartridges 102. Access device 602 retrieves and delivers cartridges 102 when controller 610 receives the corresponding command via operator panel 613. Mail slot 614 and magazine slot 626 allow individual cartridges 102 and magazines 104 to be removed from and replaced to system 600. Magazine slot 626 is positioned in partition 601 to allow access to a single magazine 104, thereby allowing a user to remove several cartridges 102 in magazine 104 at one time without prompting an inventory of the entire storage system 600. Mail slot 614 allows access to individual cartridges 102 that are handled by access device 602. External access port 628 can also provide pass-through capability, whereby two adjacent storage systems 600 communicate with each other to share cartridges 102. Pass-through capability is used, for example, to balance job loads between adjacent storage systems 600.

To overcome the disadvantages of sharing cartridges 102 between physically separate storage systems 600, controller 610 can allocate subsets of cartridges 102 and magazines 104 into more than one "logical" storage system 600. Controller 610 can balance the workload between read/write devices 612, while the subsets of cartridges 102 and magazines reside in the same physical storage system 600.

Controller 610 can respond to door lock/unlock commands, thereby controlling physical access to system 600 via door 616. In some embodiments, an authorized user can issue a magazine load/unload command, thereby causing controller 610 to unlock door 616 to allow an operator to retrieve or deliver one or more magazines 104 to system 600.

An identifier, such as a bar code label, can be affixed to each magazine 104 and cartridge 102 to identify magazines 104 and cartridges 102. Identification information on cartridges 102 can include a unique identifier, such as a serial number, as well as a job reference number, and/or other suitable identifying information. Identification information on magazines 104 can include a unique identifier, as well as the number and type(s) of cartridges 102 that can be stored in magazine 104.

Power for moving and operating access device 602 and transport device 604 can be provided by a lightweight flexible power cable (not shown) or transmitted via horizontal guideway 608 in a suitable manner. Controller 610 can be located in a cabinet 622, which can also house other devices such as read/write devices 612 and a cooling system (not shown). Control and status signals are communicated between access device 602, transport device 604, and controller 610.

Figure 7:
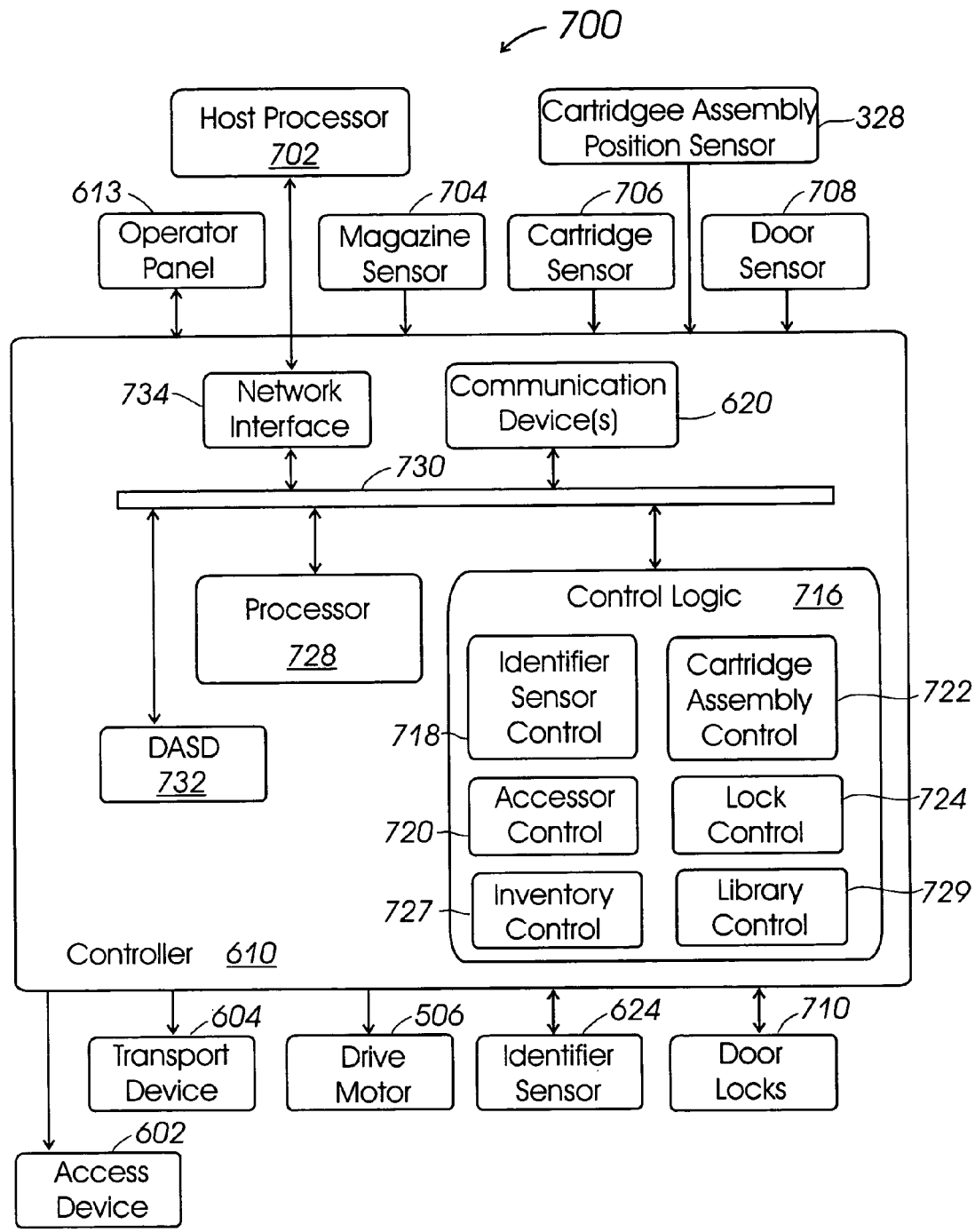
FIG. 7 is a block diagram of components included in an embodiment of a control system for managing the storage library systems of FIG. 6.

Referring to FIGS. 1, 6, and 7, FIG. 7 is a block diagram of an embodiment of control system 700 for managing storage system 600 of FIG. 6. Control system 700 includes controller 610 configured to communicate with various external components such as operator panel 613, host processor 702, magazine sensor 704, door sensor 706, cartridge sensor 708, access device 602, transport device 604 door locks 710, identifier sensor 618, and cartridge assembly(s) 100. Communication between control system 700 and external components can occur via wireless or wired communication device 620.

Controller 610 includes control logic 716, such as identifier sensor control 718, accessor control 720, cartridge assembly control 722, door lock control 724, transport device control 726, and inventory control 727 and library control 729. Control logic 716 includes executable instructions that can be implemented in software and executed by processor 728. Control logic 716 can also be implemented in hardware, firmware, or a combination of hardware, firmware, and software. Control logic 716 implemented in software can be stored and transported on any computer-readable medium for use by, or in connection with, any device capable of reading and executing the logic instructions. A computer-readable medium is an electronic, magnetic, optical, or other physical device or means that can contain or store computer executable instructions for use by or in connection with a computer-related system or method. As an example, control logic 716 may be magnetically stored and transported on a conventional portable computer diskette.

Processor 728 can be one or more of any suitable microprocessors capable of loading and executing control logic 716, as well as interfacing with other components in control system 700. Processor 728 communicates with other components in control system 700 via interface 730, which can include one or more data buses.

Network interface 734 allows controller 610 to exchange data with one or more remote host processors 702. Host processor 702 transmits requests to controller 610 to store and retrieve data. Controller 610 responds to requests from host processor 702 by determining cartridge(s) 102 to be accessed to fulfill the request, and operating cartridge assembly 100, access device 602, and transport device 604, to move the desired cartridge(s) 102 between respective slot(s) 106 and read/write devices 612.

Cartridge assembly position sensor 328 (FIG. 3), such as an optical encoder, can be coupled to cartridge assembly 100 provide feedback to cartridge assembly control 722 on the position of cartridge assembly 100. Cartridge assembly control 210 utilizes the position information to determine whether to move cartridge assembly 100 to place a particular cartridge 102 or magazine 104 within reach of access device 602. Cartridge assembly control 722 sends drive commands to drive motor 506 to move cartridge assembly 100 as required.

Accessor control 720 controls actuator systems (not shown) associated with access device 602 and transport device 604 to move access device 602 adjacent a desired cartridge 102 or read/write device 612. For example, in an initial condition, the desired cartridge 102 is stored in a particular slot 106 of magazine 104. Accessor control 720 operates to move transport device 604 and access device 602 to the selected cartridge 102. Access device 602 engages the cartridge 102 and accessor control 720 operates to move transport device 604 and access device 602 to a desired read/write device 612. Once properly positioned adjacent the desired read/write device 612, access device 602 loads cartridge 102 into read/write device 612. Once the read/write operation is complete, accessor control 720 operates access device 602 and transport device 604 to retrieve cartridge 102 from read/write device 612 and replace cartridge 102 in slot 106. Cartridge assembly control 722 and accessor control 720 can coordinate their activities to determine an optimum route.

Identifier sensor 618, such as a bar code reader, can be located on or near access device 602. Identifier sensor control 718 coordinates with accessor control 720 and cartridge assembly control 722 to position identifier sensor 618 to detect identifying information, such as bar code labels, on magazines 104 and cartridges 102. Identifier sensor 618 transmits signals containing the identifying information to controller 610. The identifying information is used in inventory control 727 to record/update the location of each magazine 104 and cartridge 102. Identifier sensor 618 also enables controller 610 to verify that the desired cartridges 102 have been located to fulfill requests from host processor 702.

Administrators are typically concerned with the security of storage system 600, as well as maintaining accurate inventory records of magazines 104 and cartridges 102 in storage system 600. Magazine sensors 704 and cartridge sensors 708 can be included to detect the insertion, removal, presence, or absence of magazines 104 and cartridges 102. Any suitable type of magazine sensors 704 and cartridge sensors 708 can be utilized, such as a mechanical switch that closes when a cartridge 102 is completely inserted into a magazine 104. At certain times, such as power up of storage system 600, inventory control 727 performs a complete audit of magazines 104 and cartridges 102 in storage system 600. The inventory records typically include information regarding the identity, contents, and location of each magazine 104 and cartridge 102. When a cartridge 102 or magazine 104 is replaced or removed, magazine sensor 704 and cartridge sensor 708 detect the change. The information is provided to inventory control 727 to update inventory records, and/or activate an alarm if the change was not authorized.

Door lock control 724 operates a door lock 710 in door 616. Door 616 remains locked until access is granted by door lock control 724. In this regard, an authorized user can generate a door open request for purposes such as removing or inserting a magazine 104 or cartridge 102. The door open request can be transmitted via host processor 702 or operator panel 613. The open-closed status of door 616 is sensed and indicated by door sensor 706, such as a magnetic switch actuated to be closed when door 616 is closed. Cartridge sensors 706 and magazine sensors 704 detect insertion and removal of cartridges 102, and inventory control 727 updates the inventory records accordingly.

Library control 729 can be included to allocate subsets of cartridges 102 and magazines 104 into more than one "logical" storage system 600. The workload between libraries can be balanced within the same physical storage system 600, thereby reducing the need for pass-through systems to share cartridges 102 between adjacent storage systems 600 to balance workload.

A direct access storage drive (DASD) 732 can be connected to interface 730 to transfer data to and from controller 610. Any suitable type of DASD 732 can be used, such as DASDs that utilize removable magnetic or optical media.

The ability to move magazines 104 around accessible and non-accessible sides of cartridge assembly 100 at least doubles the effective storage capacity of storage system 600. Further, many of the resources found in current storage systems, such as access device 602 and transport device 604 can be utilized in storage system 600.

Groups of magazines 104 can also be allocated to "logically" separate storage libraries, thereby eliminating the need for physical pass-through systems to share cartridges 102, as well as additional controllers 610, access devices 618, transport devices 604, and the like, that are required to balance loads in "physically" separate libraries.

The logic modules and circuitry described here may be implemented using any suitable combination of hardware, software, and/or firmware, such as Field Programmable Gate Arrays (FPGAs), Application Specific Integrated Circuit (ASICs), or other suitable devices. The logic modules and other components have been discussed as separate and discrete components. These components may, however, be combined or further modularized, if desired.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims.

In the claims, unless otherwise indicated the article "a" is to refer to "one or more than one".

What is claimed is:

1. A storage system comprising:
   a movable accessor;
   a computer-implemented controller;
   a cartridge transport device configured to move a plurality of cartridges along a path, wherein the path includes a front side and a back side with respect to the movable accessor; wherein:
   the controller is configured to:
      operate the movable accessor to access a first group of the plurality cartridges from the front side of the path, and
      operate the cartridge transport device to move the first group of the plurality of cartridges to the back side of the path to allow the movable accessor to access a second group of the plurality of cartridges and to move the movable accessor closer toward the second group of the plurality of cartridges while the cartridge transport device is operating;
   a mounting system installable in an enclosure, wherein the mounting system is capable of supporting at least a portion of the transport device;
   a magazine configured to store at least of portion of the plurality of cartridges;
   wherein the mounting system includes at least one support member, and a magazine guide attached to the at least one support member; and
   a drive member and wherein the magazine guide includes a roller coupled to the drive member, and the roller includes a flange at one end that is configured to retain a conveyor belt.

2. A storage system according to claim 1 further comprising:
   a position sensor coupled to detect the position of the transport device; and
   a controller coupled to the position sensor, wherein the controller is configured to determine whether to operate the transport device to provide access to a particular one of the plurality of cartridges.

3. A storage system according to claim 1 further comprising:
   inventory control operable to maintain identity and location information for each of the plurality of cartridges.

4. A storage system according to claim 1 wherein the transport device includes:
   a conveyor belt;
   a drive member configured to move the conveyor belt; and
   a drive motor coupled to receive drive command signals from the controller and to actuate the drive member.

5. A storage system according to claim 4 wherein each end of the conveyor belt includes a hinge portion that can be fastened to install the conveyor belt in the transport device.

6. A storage system according to claim 1 wherein the position sensor is one of the group of an optical, mechanical, magnetic, and electronic sensor.

7. A storage system according to claim 4 wherein the conveyor belt includes:
   a plurality of connectors configured to attach the plurality of cartridges to the conveyor belt.

8. A storage system according to claim 1 wherein the transport device is further configured to move the plurality of magazines through the magazine guide.

9. A storage system according to claim 8 further comprising a reference guide and wherein the magazine guide includes a reference edge configured to engage the reference the magazine.

10. A storage system according to claim 1 further comprising a drive member, wherein the roller includes a slotted opening, the drive member is coupled to a keyed rod, and the keyed rod is inserted through the slotted opening in the roller.

11. A storage system according to claim 1 further comprising an adjustable mount and wherein the mounting system includes a magazine guide, and a roller coupled to the magazine guide on the adjustable mount, and the adjustable mount facilitates installation of the transport device on the mounting system.

12. A storage system according to claim 1 wherein the mounting system is vertically stackable to another mounting system.

13. A storage system according to claim 1, wherein the path is substantially horizontal.

14. A storage system a to claim 1, wherein the path is substantially vertical.

15. A method for operating an automated storage system comprising:
   configuring a first plurality of cartridges along a first side of a path;
   configuring a second plurality of cartridges alone a second side of the path;
   receiving a request to access a particular cartridge; and
   moving an accessor toward the particular cartridge; and
   moving the cartridges along the path to allow the accessor to access the particular cartridge.

16. A method according to claim 15 further comprising:
   maintaining identity and location information for the particular cartridge.

17. A method according to claim 16 wherein a plurality of cartridges are storable in a magazine, the method further comprising:
   maintaining identity and location information for the plurality of cartridges; and
   determining which of the plurality of cartridges to access to fulfill the request for the particular item.

* * * * *

UNITED STATES PATENT AND TRADEMARK OFFICE
CERTIFICATE OF CORRECTION

| | |
|---|---|
| PATENT NO. | : 7,251,544 B2 |
| APPLICATION NO. | : 10/612757 |
| DATED | : July 31, 2007 |
| INVENTOR(S) | : Leslie G. Christie, Jr. |

It is certified that error appears in the above-identified patent and that said Letters Patent is hereby corrected as shown below:

In column 11, line 53, in Claim 3, after "control" and insert -- logic --.

In column 12, line 18, in Claim 9, after "the reference" insert -- guide on --.

In column 12, line 36, in Claim 14, delete "a" and insert -- according --, therefor.

In column 12, line 42, in Claim 15, delete "alone" and insert -- along --, therefor.

In column 12, line 51, in Claim 17, after "claim 16" insert -- , --.

Signed and Sealed this

Fifth Day of August, 2008

JON W. DUDAS
*Director of the United States Patent and Trademark Office*